UNITED STATES PATENT OFFICE.

HUGO WOLFF, OF MANNHEIM, GERMANY, ASSIGNOR TO BADISCHE ANILIN & SODA FABRIK, OF LUDWIGSHAFEN-ON-THE-RHINE, GERMANY, A CORPORATION.

DYES CONTAINING SULFUR AND PROCESS OF MAKING THEM.

1,061,714. Specification of Letters Patent. Patented May 13, 1913.

No Drawing. Application filed February 5, 1912. Serial No. 675,593.

*To all whom it may concern:*

Be it known that I, HUGO WOLFF, subject of the Grand Duke of Baden, residing at Mannheim, Germany, have invented new and useful Improvements in Dyes Containing Sulfur and Processes of Making Them, of which the following is a specification.

I have discovered that I can obtain coloring matters containing sulfur by heating a nitro-phenanthraquinone compound with sulfur and alkaline sulfid, either in the presence of a diluting agent, or not.

My new coloring matters consist, when dry, of dark powders which are insoluble in dilute acids and alkalis, but which are soluble in sodium sulfid solution and also in alkaline hydrosulfite solution, and dye vegetable fiber from these solutions very fast yellow to brown shades, which shades, upon treatment with nitrous acid and beta-naphthol, remain unchanged.

The following examples will serve to illustrate further the nature of my invention, which, however, is not confined to these examples. The parts are by weight.

Example 1: Heat together, in an autoclave, at from 180° to 220° C., 100 parts of 2.7-dinitro-phenanthraquinone (see *Berichte*, 36, page 3739), 100 parts of sulfur, 300 parts of crystallized sodium sulfid and 500 parts of water. When the reaction is complete, which is the case after about from 8 to 10 hours, dilute the melt with water, warm it somewhat, filter and dry. A black powder is obtained which is insoluble in water and in dilute acids and alkalis, but it is easily soluble (the solution being yellowish brown) in sodium sulfid solution and dyes cotton, from the solution or from a hydrosulfite vat, very fast khaki shades. In this example, the quantities of sulfur and of sodium sulfid, and also the temperature and time, can be varied considerably, and instead of the 2.7-dinitro-phenanthraquinone, other nitro-phenanthraquinones, such for example as the 4.5-dinitro-phenanthraquinone (see *Berichte*, 36, page 3745), or mixtures of nitro-phenanthraquinones, can be employed. Either the pure re-crystallized nitro-phenanthraquinones, or the crude products of nitration, such for example as are obtained by nitration in sulfuric acid solution with varying quantities of nitric acid, can be employed.

Example 2: Heat together, for from 2 to 3 hours, at from 230° to 240° C., 5 parts of 4.5-dinitro-phenanthraquinone, 6 parts of sodium sulfid (containing 60% of pure $Na_2S$), and 4 parts of sulfur. On grinding the melt when cold, a dark powder is obtained which is easily soluble in sodium sulfid solution and in alkaline hydrosulfite, and which dyes cotton khaki shades.

Example 3: Heat together, for about 12 hours, at 200° C., 5 parts of dinitro-dibrom-phenanthraquinone (obtained by nitrating dibrom-phenanthraquinone of melting point 284° C. in the presence of sulfuric acid), 4 parts of sulfur, 15 parts of crystallized sodium sulfid and 25 parts of water, and then work up the product as described in the foregoing Example 1. The coloring matter thus obtained dyes cotton, from sodium sulfid bath, or from a hydrosulfite vat, very fast brown shades.

Now what I claim is:—

1. The process of producing coloring matters containing sulfur by heating a nitro-phenanthraquinone compound with sulfur and alkaline sulfid.

2. The process of producing coloring matters containing sulfur by heating a nitro-phenanthraquinone compound with sulfur and alkaline sulfid in the presence of a diluting agent.

3. The process for producing coloring matter containing sulfur by heating 2.7-dinitro-phenanthraquinone with alkaline polysulfid.

4. The new coloring matters which can be obtained by heating a nitro-phenanthraquinone compound with sulfur and alkaline sulfid, which coloring matters are insoluble in dilute acids and alkalis, but which are soluble in sodium sulfid solution and also in alkaline hydrosulfite solution and dye cotton from these solutions very fast brown shades, which shades, upon treatment with nitrous acid and beta-naphthol, remain unchanged.

5. The new coloring matter which can be obtained by heating 2.7-dinitro-phenanthraquinone with alkaline polysulfid, which coloring matter is insoluble in dilute acids and alkalis, but which is soluble in sodium sulfid solution and also in alkaline hydrosulfite solution, and dyes cotton from these solutions very fast khaki shades, which shades, upon theatment with nitrous acid and beta-naphthol, remain unchanged.

In testimony whereof I have hereunto set my hand in the presence of two subscribing witnesses.

HUGO WOLFF.

Witnesses:
J. ALEC. LLOYD,
A. O. TITTMAN.